(12) United States Patent
Davis

(10) Patent No.: US 7,003,955 B2
(45) Date of Patent: Feb. 28, 2006

(54) ENHANCED PUMPED STORAGE POWER SYSTEM

(76) Inventor: Lester Davis, 248 Warner Dr., Baiting Hollow, NY (US) 11933

( * ) Notice: Subject to any disclaimer, the term of this patent is extended or adjusted under 35 U.S.C. 154(b) by 152 days.

(21) Appl. No.: 10/641,650

(22) Filed: Aug. 15, 2003

(65) Prior Publication Data

US 2005/0034452 A1 Feb. 17, 2005

(51) Int. Cl.
*F03G 6/00* (2006.01)
(52) U.S. Cl. ................... 60/641.11; 60/641.15
(58) Field of Classification Search ............... 60/641.2, 60/641.4, 641.6, 641.7
See application file for complete search history.

(56) References Cited

U.S. PATENT DOCUMENTS

| | | | | |
|---|---|---|---|---|
| 3,214,915 A | * | 11/1965 | Weibel | 60/398 |
| 3,939,356 A | * | 2/1976 | Loane | 290/52 |
| 4,110,980 A | | 9/1978 | Foulke | 60/325 |
| 4,132,901 A | | 1/1979 | Crausbay | 290/53 |
| 4,286,347 A | | 9/1981 | Modisette | 9/8 R |
| 4,341,959 A | | 7/1982 | Ambli | 290/53 |
| 4,450,689 A | * | 5/1984 | Moe | 60/641.7 |
| 4,508,971 A | | 4/1985 | Bailey | 290/1 R |
| 4,873,450 A | | 10/1989 | Quaintance | 290/52 |
| 5,047,654 A | * | 9/1991 | Newman | 290/52 |
| 6,216,455 B1 | | 4/2001 | Doleh | 60/398 |
| 6,355,988 B1 | | 3/2002 | Maple | 290/54 |
| 6,359,347 B1 | | 3/2002 | Wolf | 290/54 |
| 6,420,794 B1 | | 7/2002 | Cao | 290/43 |
| 6,445,078 B1 | | 9/2002 | Cieslak | 290/1 R |

\* cited by examiner

*Primary Examiner*—Hoang Nguyen
(74) *Attorney, Agent, or Firm*—Galgano & Burke, LLP

(57) ABSTRACT

An enhanced pumped storage power system. More particularly, the invention is a regenerative power system that utilizes the gravitational forces of downward movement of large quantities of water to convert same to electrical energy. In the preferred mode of implementation, the system utilizes a man-made lake at a first level of elevation. Though higher altitudes can be effective, the lake need only be approximately twenty to thirty feet in elevation. The lake, which may exceed one hundred acres in size, may be elevated above and adjacent a natural body of water, such as seawater at a coastline. As such, sandy terrain associated with the region facilitates initial construction of the system. An underground generator is utilized for the power conversion and pumping of the water back to the upper reservoir during times of low energy demand, allowing for significant noise reduction. Importantly, the system of the present invention may be utilized to provide significant levels of power to serve relatively large geographic areas during times of peak energy demand, when other sources of power are more expensive and subject to power outages. Finally, it should be noted that the components of the system are aesthetically-pleasing in nature, allowing the system to be effectively utilized in a residential area.

19 Claims, 1 Drawing Sheet

ENHANCED PUMPED STORAGE POWER SYSTEM

BACKGROUND OF THE INVENTION

1. Field of the Invention

Figure 1:
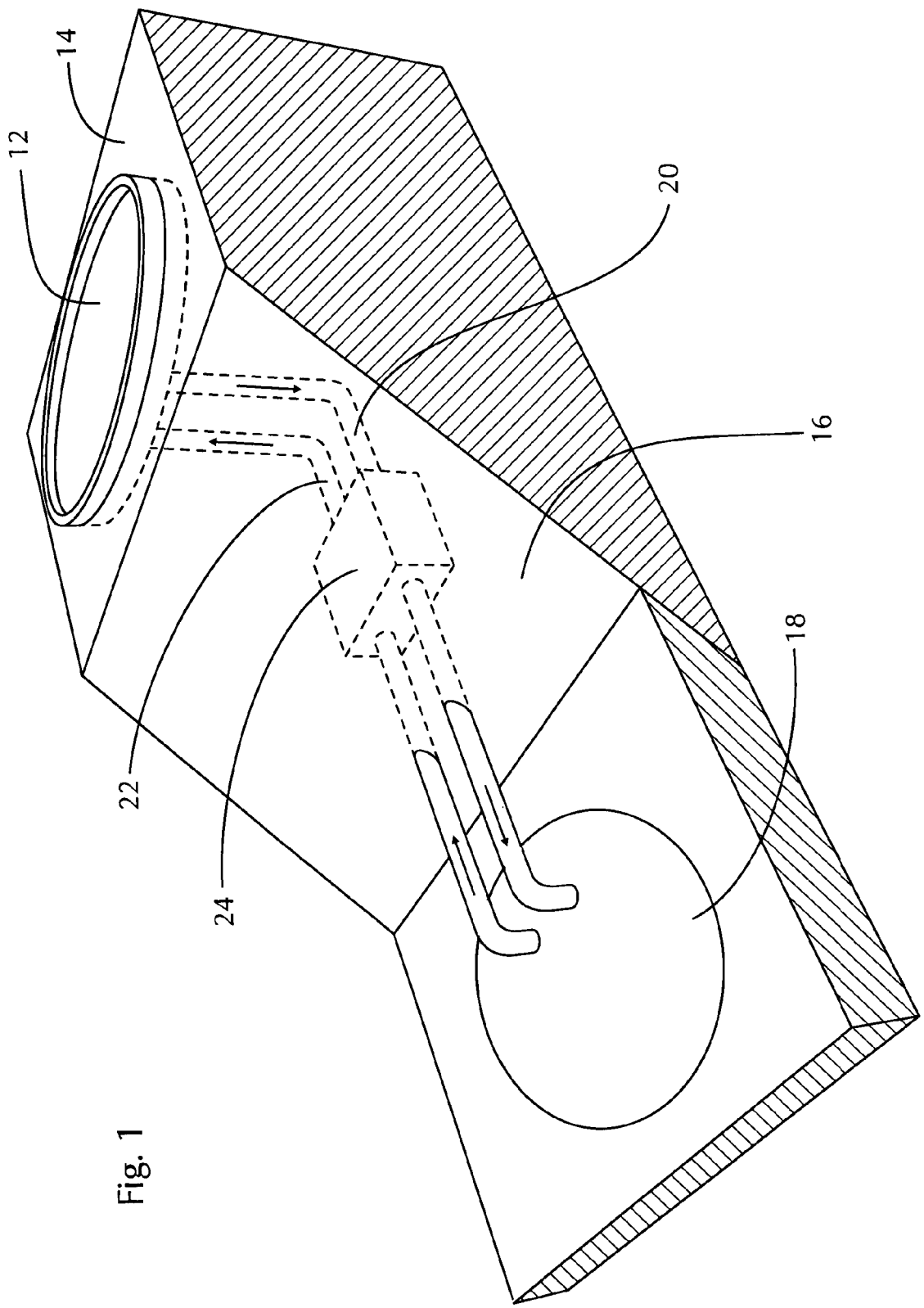

The present invention is an enhanced pumped storage power system. More particularly, the invention is a regenerative power system that utilizes the gravitational forces of downward movement of large quantities of water to convert same to electrical energy.

In the preferred mode of implementation, the system utilizes a man-made lake at a first level of elevation. Though higher altitudes can be effective, the lake need only be approximately twenty to thirty feet in elevation. The lake, which may exceed one hundred acres in size, may be elevated above and adjacent a natural body of water, such as seawater at a coastline. As such, sandy terrain associated with the region facilitates initial construction of the system. An underground generator is utilized for the power conversion and pumping of the water back to the upper reservoir during times of low energy demand, allowing for significant noise reduction. Importantly, the system of the present invention may be utilized to provide significant levels of power to serve relatively large geographic areas during times of peak energy demand, when other sources of power are more expensive and subject to power outages. Finally, it should be noted that the components of the system are aesthetically-pleasing in nature, allowing the system to be effectively utilized in a residential area.

2. Description of the Prior Art

Numerous innovations for pumped storage power systems have been provided in the prior art that are described as follows. Even though these innovations may be suitable for the specific individual purposes to which they address, they differ from the present invention as hereinafter contrasted. The following is a summary of those prior art patents most relevant to the invention at hand, as well a description outlining the differences between the features of the present invention and those of the prior art.

1. U.S. Pat. No. 4,132,901, invented by Crausbay, Entitled "Electric Power Generating System"

The Crausbay invention relates to an electric power generating system particularly adapted for use in locals where there is an absence of a water supply with sufficient elevation to supply the required power for an electrical energy generating system, or the water supply is insufficient for the required generating system. The deficiency is overcome in part by providing an elevated water supply reservoir and a system of gravity actuated water powered pumps for utilizing the discharge of the generating system to pump at least a portion of the discharge to the elevated reservoir. It is further proposed to utilize a pumping system of the wave motor type for pumping relatively available water at sea level to the elevated water reservoir. It is also proposed to provide a split stream of water from an elevated water supply to two generators at different elevations with the discharge from the uppermost generator being recombined with the other portion of the split stream for introduction into the generator at the lower level.

2. U.S. Pat. No. 4,110,980, invented by Foulke, Entitled "Apparatus For Producing Mechanical Kinetic Energy From Falling Water"

In the patent to Folke, agitation of the surface of a body of water by a falling stream of water results in the entrainment of air bubbles which are carried underneath the surface. These air bubbles are collected in a tank having a submerged open bottom. Air pressure is produced within the tank and utilized to perform useful work by operating a pneumatic pressure transformer which in turn produces high pressure air for operating a series of air-lift pumps. In an alternative embodiment a reciprocating piston motor or turbine is positioned in a path of flow between a portion of the body of water containing relatively few air bubbles and another portion containing a relatively large quantity of bubbles. Flow through this path takes place by reason of a difference in densities and is available to do useful work.

3. U.S. Pat. No. 6,355,988, invented by Maple, Entitled "Water Lift Generator System"

The patent to Maple describes a water lift generator system for generating electricity by a water system propelled by the force of water cycling through the system. A multi-chamber water lift system includes an down cycle converting the potential energy of water traveling downward through a down tube and out a nozzle or spout turned tangential to the main chamber to cause the chamber to rotate. The rotation of the system runs an up—cycle having several tee shaped tubes which operate to lift water from one chamber to the next higher chamber. The topmost chamber has an additional tee tube connecting the inner chamber with the down tube to complete the cycle. A water supply may be provided at the base of the machine to provide a closed cycle.

4. U.S. Pat. No. 4,873,450, invented by Quaintance, Entitled "Electrical Generating Apparatus And Method"

The patent to Quaintance describes an apparatus and method for generating electricity cheaply, efficiently, and with no resulting air or water pollutants. The device is pressurized so that water is forced out of the operating section of the device and up a small tube into a head tank. Once the device is in this position, a water pump in the head tank is activated thereby forcing water downward which, in conjunction with gravity, applies sufficient force to a water wheel located at the end of a large tube to turn an electrical generating device. Since the system is pressurized and sealed, water introduced into the operating section is forced continuously into the water side of the device back up the small tube and into the head tank for recycling.

5. U.S. Pat. No. 6,216,455, invented by Doleh et al., Entitled "Apparatus For Conversion Of Energy From the Vertical Movement Of Seawater"

The patent to Doleh, et al. describes an apparatus for conversion of energy from the vertical movement of seawater is made of a hollow body situated substantially upright on the sea bottom and provided with at least one aperture in a wall thereof. The water is free to move into and out of the hollow body. The apparatus also has a floating body moveable with respect to the hollow body in the vertical direction caused by the movement of the seawater level. The floating body is in communication with the space in the hollow body in order to change the volume thereof, so that a fluid flow is created inside the hollow body and is used to drive a propeller being connected directly or indirectly to an energy generator.

6. U.S. Pat. No. 4,508,971, invented by Bailey, Entitled "Two Reservoir Solar Air-Weight Impelling Hydro Power System"

In the patent to Bailey, using a two reservoir system, a portion of the water moves from reservoir to reservoir. In its path, it collects air, which is expanded by solar energy, which helps to move weights, by an expanding and contracting float method to create substantial hydro power, after which it returns back to the path of which it started, without causing any pollution and without using any outside fuel whatsoever.

7. U.S. Pat. No. 4,341,959, invented by Ambli, Entitled "Wave Energy Power Station"

In the patent to Ambli, a wave energy power station comprises two water-filled chambers in communication at the bottom, wherein a first chamber is in communication with the sea at the upper end thereof and the second chamber is defined by one or more walls which project above the surface of the sea, such that pressure variations in the sea owing to the waves will set the water in an oscillating movement between the two chambers, and energy being tapped from the oscillating system, for example, by allowing the water in the chamber which is not in communication with the sea to overflow periodically into a reservoir, from which it is led back to the sea through a turbine, or by utilizing the water column in the second chamber for drawing in and compressing air which drives an air turbine. A water-filled tank is permanently installed on the sea bed or floating in the sea, and has a bottom and one or more walls, at least one wall or a portion of one wall being terminated at the upper edge thereof below the surface of the sea, the submerged upper edge and a partition wall which can be fixed or movable up and down in the water in the tank together defining the upper end of the chamber which communicates with the sea, the partition wall also, alone or together with one or more of the tank walls which project up above the surface of the water, defining the second chamber end which is not in communication with the sea, there being provided in the case of a fixed partition wall an adjacent tank wall section which is adapted for movement toward and away from the partition wall at the end of the second chamber for regulating the cross-sectional surface at that chamber end.

8. U.S. Pat. No. 4,286,347, invented by Modisette, Entitled "Double Acting Turbine For Converting Wave Energy Of Water To Electrical Power"

The patent to Modisette describes a double acting turbine for converting water wave energy to electrical power in a marine buoy or platform. A tubular body is provided one end of which is adapted to be inserted into the water wave and the second end is adapted to extend out of the water whereby the rise and fall of water in the body creates a flow of air in alternate directions through the body. A turbine having a plurality of outwardly extending blades is positioned in the body above the water level and exposed to and rotated by the flow of air and is connected to an electrical generator for generating electricity in response to the rotation of the wheel. The turbine is designed to operate with air flowing in either direction through the turbine so that power is generated as the water both rises and falls in the tubular body. The turbine blades include a concave surface on one side and a convex surface on the opposite side. The cross-sectional shape of the blades are shaped to provide an air flow passageway between adjacent blades which decreases in area from each edge thereby forming a restriction in the passageway between the blade edges whereby the wheel will rotate in a single direction regardless of the direction of flow of air through the body. A stator may be provided on each side of the turbine wheel having a plurality of blades directed towards the concave surfaces of the blades of the turbine wheel. In order to increase the amount of air flow through the body, the body may include a plurality of housings.

9. U.S. Pat. No. 6,445,078, invented by Cieslak, Jr., Entitled "Gravity Electrical Generating System"

The patent to Cieslak, Jr. describes a system for gravity generation of electricity which includes upper and lower water reservoirs with a conduit between the reservoirs and a pump to continuously pump water from the lower reservoir to the upper reservoir. A number of water containers are positioned side-by-side and mounted for up and down travel between the upper and lower reservoirs. When the containers have attained their upper most position at the upper reservoir, they are engaged by limit switch mechanisms to fill the containers with water from the upper reservoir. Upon being filled the containers travel by gravity to their lower most position to the lower reservoir wherein additional limit switch mechanisms are employed to drain the containers into the bottom reservoir. As the containers travel downwardly, they engage and drive an electric generator for generating large quantities of electricity. Once the containers are at their lower most position and have been fully drained they are driven back up to the upper reservoir for refill by independent geared motors.

10. U.S. Pat. No. 6,420,794, invented by Cao, Entitled "Hydropower Conversion System"

The patent to Cao describes a hydropower conversion system for circulation of water between a delivering reservoir and a receiving reservoir through hydro-turbines, pumps, and back-up reservoir. Water in the delivering reservoir is maintained at a constant functioning level by adjusting valve linked with valve control mechanism to adjust the opening and closing of passages conducting water flowing from the back-up reservoir into the delivering reservoir. Outlets allow excess water to flow out of the back-up reservoir back down to the receiving reservoir. The hydro-turbines are connected to power machinery. The pumps are driven by a natural energy source. In one embodiment, the receiving and delivering reservoirs are structurally connected; in another embodiment, the two reservoirs are separate reservoirs.

11. U.S. Pat. No. 6,359,347, invented by Wolf, Entitled "Siphon Hydroelectric Generator"

The patent to Wolf describes a method and apparatus for generating hydroelectric power from a water source by lifting water from a relatively lower position to a second relatively raised position. The water is moved in a generally upward direction stepwise from a lowermost tier to an uppermost tier in a plurality of stacked tiers. The water from the water source is initially upwardly siphoned to the lowermost tier. The water from the lower tier is then upwardly siphoned to a next adjacent higher tier. The water from the uppermost tier is channeled down to turn a turbine driven generator to produce electrical power.

12. U.S. Pat. No. 4,282,444, invented by Ramer, Entitled "Method For Deep Shaft Pumpback Energy Generation"

In the patent to Ramer, a method and apparatus are disclosed for converting the potential energy stored in an upper reservoir of water into electrical energy, whereby, during periods of high energy demand, water is introduced from the upper reservoir into an underground salt dome by way of an underground shaft which connects the upper reservoir with the underground salt dome. Hydroelectric generators which are located along the shaft convert the kinetic energy of the falling water into electrical energy to meet periodic high energy demands. The water empties into the underground salt dome and dissolves a cavity in the same to produce a large underground reservoir. During periods of electrical energy surplus, electric pumps are utilized to pump the water back to the surface so that the process may be repeated.

In contrast to the above described prior art, the present invention is a pumped storage power system that relies upon the downward pressure of water from a relatively low head or level of elevation to produce electrical power.

As such, the present invention is distinguished from the tidal or cyclical wave power systems common in the prior art, such as that utilized in the Bay of Fundy, Canada. In such a prior art system, consistent waves in excess of twenty feet in height are relied upon to generate electrical power.

An additional power project located in North Blenheim, N.Y., known as the New York Power Authority's Blenheim Gilboa Power Project, teaches the usage of a pumped storage system, however the same requires a head of several hundred feet. Specifically, the Blenheim Gilboa Power Project utilizes a mountain adjacent a river to comprise a significant differential in altitude between the reservoirs—a configuration not available in many geographic areas. An additional drawback associated with such a system is the need to dam a portion of the river during construction of the system, adding to the cost of implementation significantly.

No prior art reference appears to teach the usage of a dual reservoir pumped storage system wherein the bottom of the upper man-made lake lies only twenty to thirty feet above the top of the lower man-made lake. Importantly, this configuration allows the system to be utilized in virtually any geographic area, particularly flat land such as that commonly found on islands and adjacent coastlines.

SUMMARY OF THE INVENTION

As noted, the present invention is an enhanced pumped storage power system. More particularly, the invention is a regenerative power system that utilizes the gravitational forces of downward movement of large quantities of water to convert same to electrical energy.

In the preferred mode of implementation, the system utilizes a man-made lake at a first level of elevation. Though higher altitudes can be effective, the lake need only be approximately twenty to thirty feet in elevation. The lake, which may exceed one hundred acres in size, may be elevated above and adjacent a natural body of water, such as seawater at a coastline. As such, sandy terrain associated with the region facilitates initial construction of the system.

An underground generator is utilized for the power conversion and pumping of the water back to the upper reservoir during times of low energy demand, allowing for significant noise reduction. Importantly, the system of the present invention may be utilized to provide significant levels of power to serve relatively large geographic areas during times of peak energy demand, when other sources of power are more expensive and subject to power outages. Finally, it should be noted that the components of the system are aesthetically-pleasing in nature, allowing the system to be effectively utilized in a residential area.

In light of the foregoing, it is generally an object of the present invention to provide a pumped storage power system which produces sufficient levels of energy to power significantly sized geographic areas.

It is also an object of the invention to provide a system that allows municipalities and towns to generate their own electricity.

It is another object of the present invention to provide a system which is regenerative in nature and cost-effective to operate on a long-term basis, serving the primary objective of providing inexpensive power at the time it is most needed.

It is an object of the invention to provide a pumped storage power system that takes advantage of the ordinary daily highs and lows in demand for power, working within the cyclical system efficiently.

It is an additional object of the invention to provide a system that may be effectively constructed in a variety of overall sizes, suitable to meet the needs and demands of the area in question.

It is also an object of the invention to provide a pumped storage power system which is relatively easy to construct and implement.

It is a further object of the invention to provide a system that is tailored to the topography of the geographical area in which it is constructed, using the terrain thereon to its benefit.

It is an additional object of the invention to provide a system that may incorporate a variety of cosmetic considerations.

It is an additional object of the invention to provide a system that maintains the aesthetic appearance of geographical areas in which it is constructed, including residential housing developments.

It is an additional object of the invention to provide a system that operates at relatively low noise levels, rendering same suitable for usage in a variety of areas, including residential areas.

It is an additional object of the invention to provide a pumped storage power system that is clean to operate.

It is a further object of the invention to provide a system that is environmentally conscious in nature.

It is another object of the invention to provide a system that allows for convenient visual inspection of all key components.

It is a further object of the invention to provide a pumped storage power system that is reliable in nature.

It is an object of the invention to provide a pumped storage power system that utilizes an efficient closed cycle system, in which the same water is used for pumping and generating power.

It is a further object of the invention to provide a system that is suitable for providing cranking power to restart unrelated plants and facilities that lose power due to severe storms, blackouts and mechanical failure.

It is another object of the present invention to provide a pumped storage power system with rapid response capability.

Finally, it is an object of the present invention to provide a system which is environment friendly, and which preserves natural resources effectively.

The novel features which are considered characteristic for the invention are set forth in the claims. The invention itself, both as to its construction and its method of operation, together with additional objects and advantages thereof, will be best understood from the following description of the embodiments when read and understood in connection with accompanying drawings.

BRIEF DESCRIPTION OF PREFERRED EMBODIMENTS

FIG. 1 is a schematic representation of the present invention, illustrating the principal components and concepts utilized therein.

DETAILED DESCRIPTION OF THE PREFERRED EMBODIMENT

Referring to: FIG. 1, which is a schematic representation of the present invention, illustrating the principal components and concepts utilized therein:

As noted above, the present invention is an enhanced pumped storage power system. More particularly, the invention is a system that utilizes the gravitational forces of downward movement of large quantities of water to convert same to electrical energy.

In the preferred mode of implementation, the system utilizes a man-made lake or reservoir (12) at a first level of elevation (14). Though higher altitudes can be effective, the lake (12) need only be approximately twenty to thirty feet in elevation for effective usage of the present system. Such is because the gravitational forces associated with such relatively minimal head or height of elevation are sufficient to power the system. As such, bluffs or cliff-like areas adjoining bodies of water are especially suitable for location of the man-made reservoir.

Accordingly, in a first mode of the present invention, the lake or reservoir (12) is elevated above and adjacent a natural body of water, such as seawater at a coastline. Such is generally depicted by the area (18) in the schematic representation of FIG. 1. It is also important to note that the lake or reservoir (12) may be several hundred acres in size, or alternatively, may be considerably smaller, based upon area energy needs and geographical limitations.

The lake (12) and first level of elevation (14) lie above the ground area (18) at a previously-determined degree of pitch or angle (16), according to the particular needs of the system. It is important to note that sandy terrain associated with a saltwater region facilitates initial construction of the system, as such ground is relatively easy to excavate and alter accordingly. Such is in sharp contrast to certain prior art systems, wherein blasting of bedrock and removal of stone is essential to system construction.

In the preferred mode, at least one underground turbine and generator unit (24) is utilized for the power conversion and is linked to a single conduit. An alternate mode comprising a water tower may utilize a first conduit (22) and second conduit (20). Moreover, in the preferred mode, each turbine and generator unit (24) comprises a reversible hydraulic pump turbine.

During operation of the system, which is intended to be in times of peak energy demand, the water descends from the upper lake or reservoir through the first conduit. This, in turn, rotates the plurality of turbine or turbines, which are rigidly affixed to generators to produce electrical power.

As noted above, the generators are reversible in nature, allowing for the pumping of the same water through a second conduit back to the upper reservoir, to complete a highly efficient closed cycle. Thus, when reversed, the generators become motors and the turbines become pumps to return the water to the upper reservoir quickly and in a space-conserving manner.

Such allows the total system to store energy in the form of placement and containment of large quantities of water at the upper lake or reservoir (12) during periods of low energy demand, to be used later during high energy demand periods, at which time traditional sources of energy are considerably more expensive and subject to power outages. Furthermore, the level of total power output may be controlled by a plurality of gates that function to regulate the flow of water therethrough.

The preferred underground placement of the generator (24) allows for significant noise reduction, which functions to allow the system to be conveniently placed in residential areas, such as those that typically line coastlines.

Importantly, the system of the present invention may be utilized to provide significant levels of power to serve relatively large geographic areas, particularly during times of relatively high usage and cost. It is further intended that municipalities have the ability to create their own power through usage of the present system, which allows for additional revenue streams for such local governments.

As noted above, the system is designed to pump water upwardly through the conduit to the upper lake or reservoir during periods of low demand for electricity. Examples of same include late night periods, at which time the system uses conventional power to pump for later power generation. Although such conventional power has a cost associated therewith, in consideration of the general objectives of the invention, the system is intended to utilize the least expensive means of power during such low demand periods. The importance of the present invention is related to timing, and the ability to provide low cost electrical power at the times that the same is most greatly needed. For the purposes of example, regarding relative cost, the system would consume electricity at a cost of less than one cent per Kilowatt hour during the middle of the night, and sell electricity during higher daytime demand at four cents plus per Kilowatt hour.

It should also be noted that the components of the system are aesthetically-pleasing in nature, allowing the system to be effectively utilized in residential areas. Combined with the fact that the system emits relatively low levels of noise, as noted above, the system is especially suitable for usage within suburban housing communities. As such, a particular configuration of the present system allows the same to be built in a center area, with a plurality of homes built therearound.

Turning to a second embodiment of the present invention, the system may also utilize a traditional water tower to function as the first reservoir, the system otherwise using the same concepts and theories as described above with regard to the first embodiment.

More particularly, in the second embodiment, the traditional-type water tower contains a previously-determined quantity of water at an elevation common for town or municipal water supply. The capacity of a town water tower is sufficient for the purposes of the invention, and the appearance of the water tower is familiar to all area residents. Because the present invention teaches the usage of a system that works effectively without very high elevation, the height of a standard water tower is also sufficient to provide enough downward pressure to generate the requisite degree of electrical power.

Although the usage of a water tower as the upper reservoir inherently provides less power than the preferred embodiment described above, this second embodiment is still effective for small to medium sized geographic areas and regions of lower or average population. Importantly, the water towers are predominantly previously-existing, allowing for conversion to the power system of the present invention at minimal cost. Accordingly, the usage of water towers conserves considerable amounts of land and space to the benefit of the community.

Furthermore, the second embodiment utilizes efficient impellers that have very little negative effect on water pressure, dropping only 3 to 4 pounds pressure. It is also especially important to note that peak periods of usage of electrical power generally correspond to peak periods of usage of town or municipal water. For the purposes of example, the highest demands for electrical power are typically during the hottest temperatures of the summer, when water usage is also at a high rate. This is because the commercial and residential population typically utilizes sprinkler systems and the like at the same time that air conditioners are in full usage. As such, the second embodiment of the present invention provides a particularly efficient means to generate electrical power, as the system works perfectly in conjunction with previously-existing needs.

Next, in a third embodiment of the present invention, the system utilizes a first reservoir upon generally flat land in conjunction with a relatively large concavity in which the second reservoir sits. This comprises the difference in elevation required to generate strong gravitational forces between the dual reservoirs to generate electrical power, and all other concepts and theories associated with the above-described embodiments are incorporated therein.

More particularly, in this third embodiment, the first reservoir is actually located at ground level adjacent a large concavity or crater in the landscape. The second, lower reservoir is located within this concavity, working much in the manner as described above with the primary embodiment, with the sizes of the two reservoirs consistent with those described above.

As such, the third embodiment importantly allows for usage of the concepts and benefits of the present invention absent true elevation above the landscape of the first reservoir, rendering same usable in virtually any area. Importantly, the head or elevation may again be as low as twenty to thirty feet above the water level of the lower reservoir for the system to work effectively.

It must also be noted that an additional benefit of the level ground pumped storage system is that excess sand excavated from the concavity to create the structure may be subsequently sold for the purpose of generating additional revenue. Following excavation, a previously-determined quantity of sand can first be used to create a berm for the upper reservoir at the ground level. Thereafter, unused sand may be sold to offset capital costs for creation and implementation of the system of the present invention. This provides an additional incentive for municipalities or private businesses to utilize the present invention, much to the benefit of the overall community.

Finally, it should be noted that the level ground system allows for usage in freshwater areas, as distinguished from salt water areas. One benefit of same is that the level ground system will not be subject to harmful leaks in the manner that could occur if a system is implemented in a salt water area.

With regards to all descriptions and graphics, while the invention has been illustrated and described as embodied, it is not intended to be limited to the details shown, since it will be understood that various omissions, modifications, substitutions and changes in the forms and details of the device illustrated and in its operation can be made by those skilled in the art without departing in any way from the spirit of the invention.

Without further analysis, the foregoing will so fully reveal the gist of the present invention that others can readily adapt it for various applications without omitting features that, from the standpoint of prior art, constitute essential characteristics of the generic or specific aspects of this invention. What is claimed as new and desired to be protected by Letters Patent is set forth in the appended claims.

What is claimed is:

1. An enhanced pumped storage power system comprising:
    an upper reservoir in the form of a man-made lake for containment of water,
    a lower reservoir at a location lower than the upper reservoir, wherein said upper reservoir is at an elevation of about 20 feet to about 50 feet above said lower reservoir,
    at least one reversible turbine and generator unit,
    a first conduit extending from the upper reservoir to said at least one reversible turbine and generator unit, located in proximal relation to said lower reservoir, wherein downward flow of the water through said first conduit serves to engage and rotate said at least one turbine and generator unit for the purpose of generating electrical power, and wherein, during periods of low energy demand, said at least one turbine and generator unit is reversed so that it functions as a pump powered by conventional means, thereby directly pumping water upwardly through a second conduit to return the water to said upper reservoir.

2. The enhanced pumped storage power system as described in claim 1, wherein said system utilizes a quantity of said turbine and generator units in the range of 2 to 6 units.

3. The enhanced pumped storage power system as described in claim 1, wherein said upper reservoir is of a size in the range of 50 to 400 acres.

4. The enhanced pumped storage power system as described in claim 1, wherein said upper reservoir is proximate to saltwater, freshwater, or brackish water.

5. The enhanced pumped storage power system as described in claim 1, wherein said system is constructed in the center of a residential development with houses built there around.

6. The enhanced pumped storage power system as described in claim 1, additionally including a plurality of gates that regulate a flow of water therethrough, thereby controlling the level of power output of said turbine and generator unit.

7. An enhanced pumped storage power system comprising:
    an upper reservoir in the form of a water tower for containment of water, wherein said upper reservoir is at an elevation of about 20 to about 100 feet above ground level,
    at least one reversible turbine and generator unit,
    a first conduit extending from said upper reservoir to said at least one reversible turbine and generator unit, wherein downward flow of said water through said first conduit serves to engage and rotate said at least one turbine and generator unit for the purpose of generating electrical power, and wherein, during periods of low energy demand,
    said system utilizing previously-existing pumps to draw underground water, thereby directly pumping water upwardly through a second conduit to return the water to said water tower.

8. The enhanced pumped storage power system as described in claim 7, wherein said system utilizes a quantity of said turbine and generator units in the range of 2 to 6 units.

9. The enhanced pumped storage power system as described in claim 7, wherein said upper reservoir is of a variable size.

10. An enhanced pumped storage power system comprising:
- an upper reservoir in the form of a man-made lake for containment of water at a ground level,
- a lower reservoir located within a concavity below said ground level and adjacent to said upper reservoir,
- at least one reversible turbine and generator unit,
- a first conduit extending from said upper reservoir to at least one reversible turbine and generator unit, located in proximal relation to said lower reservoir, wherein downward flow of said water through said first conduit serves to engage and rotate said at least one turbine and generator unit for the purpose of generating electrical power, and wherein, during periods of low enemy demand, said at least one turbine and generator unit is reversed, so that it functions as a pump, thereby directly pumping water upwardly through a second conduit to return said water to said upper reservoir.

11. The enhanced pumped storage power system as described in claim 1, wherein said system utilizes a quantity of said turbine and generator units in the range of 2 to 6 units.

12. The enhanced pumped storage power system as described in claim 10, wherein said upper reservoir is of a size in the range of 50 to 400 acres.

13. The enhanced pumped storage power system as described in claim 10, additionally including a plurality of gates that regulate a flow of water therethrough, thereby controlling the level of power output of said turbine and generator unit.

14. The enhanced pumped storage power system as described in claim 10, wherein said concavity is made by excavation of a sand deposit, said upper reservoir has a berm made of sand, and wherein said sand for use in creation of said berm results from said excavation of said concavity.

15. An enhanced pumped storage power system comprising:
- an upper reservoir in the form of a man-made lake for containment of water at a previously-determined elevation,
- a lower reservoir at a location lower than the upper reservoir,
- at least one reversible turbine and generator unit; and
- a single conduit extending from the upper reservoir to said at least one reversible turbine and generator unit, located in proximal relation to the lower reservoir, wherein downward flow of the water through said single conduit serves to engage and rotate the turbine and generator unit for the purpose of generating electrical power, and wherein, during periods of low energy demand,
- said at least one turbine and generator unit is reversed so that it functions as a pump powered by conventional means, thereby pumping water upwardly through said single conduit to return the water to the upper reservoir.

16. An enhanced pumped storage power system according to claim 15 wherein,
said turbine and generator unit comprises a reversible, hydraulic pump turbine.

17. The enhanced pumped storage power system as described in claim 1, wherein said at least one reversible turbine and generator unit is underground.

18. The enhanced pumped storage power system as described in claim 7, wherein said at least one reversible turbine and generator unit is underground.

19. The enhanced pumped storage power system as described in claim 10, wherein said at least one reversible turbine and generator unit is underground.

* * * * *